3,254,140
PROPYLENE-ACETYLENIC HYDROCARBON BLOCK COPOLYMERS AND PROCESS FOR PREPARING SAME
Hugh J. Hagemeyer, Jr., and Marvin B. Edwards, Longview, Tex., assignors to Eastman Kodak Company, Rochester, N.Y., a corporation of New Jersey
No Drawing. Filed Dec. 4, 1961, Ser. No. 156,975
17 Claims. (Cl. 260—897)

This invention relates to novel polymers and methods for preparing the same. More particularly, the present invention relates to novel, solid, crystalline polymers prepared from propylene and acetylenic hydrocarbons and to the process for their preparation.

In recent years, a number of high molecular weight polymers having a crystalline structure have been prepared, particularly from olefins, by subjecting the monomer to relatively mild conditions of temperature and pressure in the presence of solid stereospecific polymerization catalysts. Such polymers have been used extensively in a number of different applications including, for example, use in fibers, molding and coating applications, depending upon the specific properties of the polymer. The prior art crystalline polymers are, however, deficient as wholly desirable polymers for many uses since they do not exhibit the combination of good stiffness, tensile strength, elongation, impact strength, hardness and brittle point necessary for such uses. Thus, crystalline polyethylene and polypropylene, although they do exhibit a number of good physical properties, do not exhibit optimum stiffness in flexure and tensile strength which are so advantageous in injection molding, film and fiber applications. It is evident, therefore, that the state of the art will be greatly enhanced by providing a crystalline polymer which combines exceptionally high stiffness in flexure and tensile strength with many of the very desirable physical properties of prior art crystalline polymers. Likewise, a noteworthy contribution to the art will be a method for preparing such polymers.

Accordingly, it is an object of this invention to provide novel crystalline polymers.

Another object of this invention is to provide novel crystalline polymers which exhibit a combination of properties heretofore unattainable with crystalline polymers.

Still another object of this invention is to provide novel crystalline polymers having significantly improved specific properties, for example, stiffness in flexure and tensile strengths, when compared with prior art crystalline polymers.

Still another object of this invention is to provide novel crystalline polymers which, by virtue of their improved combination of properties, are particularly useful in molding applications where they exhibit superior moldability, low mold shrinkage, lower densities, better mold finish, as well as having optimum film and fiber forming properties when compared with most crystalline prior art polymers.

Still another object of this invention is to provide a novel process for preparing the aforementioned novel crystalline polymers.

Other objects will become apparent from an examination of the description and claims that follow.

In order to accomplish these objects it was necessary to prepare entirely new crystalline polymers, i.e., polymers which are 100 percent insoluble in boiling hexane or show 100 percent crystallinity by X-ray diffraction, which differ markedly from prior art crystalline polymers in chemical composition and combination of physical properties. These novel polymers are solid, crystalline polymers in which the polymer chains comprise two separate and distinct crystalline segments, i.e., a "body" segment and a "tail" segment. The body segment is a polymerized crystalline chain of a polymerizable monomer which chain is terminated by a different polymerized monomer group. This terminating polymerized monomer group is also crystalline and comprises the minor portion of the novel polymers, by weight, when compared to the weight of body segment and is designated as the tail segment. There are numerous types of novel polymers of this invention depending upon the nature of the crystalline body segment and the crystalline tail segment. Thus, there are di-hydrocarbon novel polymers in which each of the segments are crystalline polyhydrocarbon, for example, crystalline segments of polymerized olefinic or acetylenic hydrocarbons or mixtures thereof, as exemplified by ethylene, propylene, butene-1, styrene, butadiene, tetramethylbutadiene, isoprene, acetylene and the like. Still other types of novel polymers of this invention are those in which the crystalline body segments are polymerized propylene and the crystalline tail segments are polymerized ethylene and styrene. This type of polymer is a ternary and would be designated propylene-ethylene-styrene polymers. Still other types of novel polymers of this invention are hydrocarbonvinyl polymers in which the crystalline body segments are hydrocarbon, for example, polymerized propylene, and the crystalline tail segments are polymerized vinyl compounds, for example, vinyl chloride.

The novel polymers of this invention are not to be confused with prior art copolymers, amorphous or crystalline, since these prior art copolymers do not exhibit the excellent combination of properties or the chemical structure exhibited by the novel polymers. Thus, as exemplified by U.S. Patent 2,918,457, a crystalline copolymer can be prepared in slurry phase in an inert reaction medium by the simple expedient of subjecting a mixture of propylene and one or more other monomers to polymerization conditions in the presence of a solid, stereospecific polymerization catalyst. However, this type of process results in a copolymer having a random distribution of each of the polymerized monomers in the polymer chain and does not exhibit the stereoregular structure characteristic of novel polymers of this invention. The random copolymers of the prior art exemplified by this U.S. Patent 2,918,457 contain polymer chains which can be represented by the structure AABABBABA. In contrast, the novel polymers of this invention can be represented as containing polymer chains represented by the formula AAAAABB wherein A and B are polymerized monomers, AAAAA is the crystalline body segment, and BB is the crystalline tail segment. It is the precise arrangement of the polymerized monomers in the polymer chains of the novel polymers of this invention that makes it possible for the polymers to exhibit the excellent combination of physical properties which distinguish them from crystalline polymers prepared heretofore.

Also, in prior art polymers prepared from two or more polymerizable monomers, it has often been found that the polymer is a blend containing large amounts of mixtures of homopolymers prepared from each of the polymers. These blends are, of course, quite distinct from the novel polymers of this invention since the latter contain the polymer components in a single polymeric chain. In preparing the novel polymers of this invention it is advantageous to use no more polymerizable monomer in the process than can be terminally attached to the crystalline body segments of the polymer chains in the polymer, the exact amounts being determinable by the polymer being produced and the polymerization conditions employed. By operating in this manner, it is possible to avoid the production of a poly blend or a prior art type of copolymer. Thus, the novel polymers can be prepared by polymerizing a crystalline tail segment of a polymerizable monomer onto a preformed crystalline body segment of the polymer chain formed from a different polymerizable monomer using a solid stereospecific polymerization catalyst.

The propylene polymers in which the polymer chains are crystalline polymerized propylene body segments terminated by crystalline tail segments of polymerized acetylenic hydrocarbons are of particular interest. Thus, these propylene-acetylenic hydrocarbon novel polymers exhibit an exceptionally increased stiffness in flexure and tensile strength when compared with either prior art crystalline polymers, for example, crystalline polypropylene or propylene polymers containing tail segments of polymerizable monomers different from acetylenic hydrocarbons. The exceptionally increased stiffness in flexure and tensile strength exhibited by the propylene-acetylenic hydrocarbon polymers are combined with the other desirable properties reported for prior art crystalline polymers such as crystalline polypropylene even when very small amounts of acetylenic hydrocarbon, for example, less than 1 percent, by weight, are present in the novel polymers.

The novel polymers of this invention can contain varying amounts of each of the monomers in polymeric form in a single chain, as is obvious to one skilled in the art. A wide variation of specific properties can be achieved by appropriate selection of the monomers employed, the amounts of each monomer employed in preparing the novel polymers, polymerization conditions, and ratio of catalyst components used in forming the polymer. For example, propylene polymers in which the crystalline tail segments are polymerized acetylene and contain only .7 percent by weight, of polymerized acetylene, exhibit a stiffness in flexure of 173,000 p.s.i., while a propylene polymer of comparable melt index, in which the crystalline tail segment is polymerized methylacetylene and contains .4 percent, by weight, of polymerized methylacetylene, exhibits a stiffness in flexure of 175,000 p.s.i.

As already indicated, propylene polymers in which the crystalline tail segment is polymerized acetylenic hydrocarbon are of particular interest by virtue of their desirable combination of properties, including very high stiffness in flexure and tensile strengths, even with relatively small percentages for example, 5 percent or less, by weight, of acetylenic hydrocarbon in the polymer. In order to obtain these propylene polymers exhibiting the optimum combination of physical properties it is desirable that the polymer contain at least 80 percent, by weight, of polymerized propylene and at least about .1 percent, by weight, of acetylenic hydrocarbon in polymerized form. Thus, very desirable propylene polymers are those in which the crystalline body segments are polymerized propylene and the crystalline tail segments are acetylenic hydrocarbons in polymerized form, which polymers contain about 80 to about 99.9 percent, by weight, of polymerized propylene and about .1 to about 20 percent, by weight, of acetylenic hydrocarbon in polymerized form. In general, such propylene polymers will exhibit molecular weights (Staudinger) of at least 10,000 and preferably molecular weights in the range of about 15,000 to about 100,000. The molecular weights of these polymers can be readily determined from their inherent viscosity in Tetralin at 145° C. using the Staudinger equation. Thus, the inherent viscosity of these polymers in Tetralin at 145° C. is at least 0.40 and is preferably in the range of about .55 to about 2.4. In addition these polymers exhibit densities (ASTM D1505–57T) of at least 0.85, with densities in the range of about 0.87 to about 0.92 being preferred.

As already indicated, the novel polymers of this invention are prepared in a multistage polymerization procedure comprising initially polymerizing a polymerizable monomer, for example, propylene and then polymerizing at least one different polymerizable monomer, for example, an acetylenic hydrocarbon such as acetylene, in the presence of the polymer chain of the first monomer using a solid stereospecific polymerization catalyst. Thus, propylene or acetylene for example, is contacted with a solid stereospecific polymerization catalyst to form a crystalline polymer chain and the second monomer is then polymerized onto the preformed polymer chain in the presence of the solid stereospecific catalyst. To prepare the most desirable propylene polymers in which the polymer chains are crystalline body segments of propylene terminated by crystalline tail segments of acetylenic hydrocarbons the polymerization reaction is continued until the resulting polymer contains at least 80 percent, by weight, of polymerized propylene. This multistage process can be conducted in a single reactor having separate reaction zones, preferably separated by a baffle or other separation means. However, the separate polymerization reactions forming our process can also be conducted in separate reactors arranged in series and alternatively the entire process can be carried out in an elongated tubular reactor. The novel polymers of this invention can also be produced batchwise by carrying out the first stage of the polymerization with a polymerizable monomer, for example, propylene or acetylenic hydrocarbon and adding the second monomer, after a portion of the first monomer, for example, 20–30 percent, has been polymerized. However, in the preparation of the propylene polymers it is preferred that the propylene be employed as the monomer in the first stage. The exact amount of monomer fed after the first stage of the reaction is subject to wide variation depending upon such variables as the reaction conditions employed, the percent of monomer converted in the first stage, the desired molecular weight of the resulting polymer and similar factors. Consequently the amount of monomer fed in a specific situation will depend upon the correlation of the several variable factors. However, in the case of propylene the novel polymers of this invention exhibiting the exceptional stiffnesses and tensile values referred to hereinbefore, this amount of monomer will be such that the resulting polymer contains at least .1 percent, by weight, of an acetylenic hydrocarbon in polymerized form, and preferably at least 80 percent, by weight, of propylene, in polymerized form.

The solid stereospecific polymerization catalyst that are employed in practicing this invention are an important feature of the process. A number of these solid stereospecific catalysts are known in the prior art. These catalysts are initially mixtures of at least two components, the first component being, for example, a halide of a transition element from the fourth to the sixth subgroups of the Periodic Table and the second component being a metal of Group I-A or II or aluminum, or an alloy of metals of Group I-A and/or II and/or aluminum, or a halide or organometallic compound of a metal of Group I-A or II and/or aluminum, or a complex hydride or a complex organometallic compound of boron or aluminum and a metal of Group I–A or II of the Periodic Table found in "Lange's Handbook of Chemistry," 8th edition (1952), published by Handbook Publishers, Inc., at pages 56 and 57, for example.

The transition metals included in Groups IV–B—VI–B of the Periodic Table are exemplified by metals such as titanium, zirconium, vanadium, molybdenum, chromium and the like. The transition metal halide catalyst components can be used at their maximum valence, or if desired, a reduced valency form of the halide can be employed. It is preferred to use the titanium chlorides which can be in the form of titanium tetrachloride, titanium trichloride or titanium dichloride. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride and the like.

Suitable second components which can be employed in conjunction with the transition element halides to form an effective solid, stereospecific polymerization catalyst include, for example, metal alkyls, metal alkyl halides and metal hydrides of aluminum or Group I–A and II as well as the metals alone. The preferred component is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein $x$ and $y$ are integers from 0 to 4, the sum of $x$ and $y$ is 4 and R is a hydrocarbon radical. Suitable Group I–A or II metals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, sodium hydride, calcium hydride, lithium aluminum hydride and the like. Also, the catalyst composition can contain an organo aluminum compound such as aluminum triethyl, aluminum tributyl, ethyl aluminum dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminum dichloride, dibutyl aluminum chloride, diethyl aluminum chloride and the like. If desired, a third component can be employed in order to increase the stereospecificity of the catalyst. Suitable third components include the halides of alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium, lithium alkyls, lithium aluminum hydride, lithium hydride and lithium aluminum tetraalkyls in combination with the reduced valency form of the transition elements from the fourth to the sixth group of the Periodic Table are preferred for high temperature solution or melt polymerization procedures. These catalysts are particularly effective at temperatures above 120° C., for example at 170° C. or higher, and, at these elevated temperatures, it is possible to obtain propylene polymers containing less than 5 percent and preferably less than 1 percent, by weight, of an acetylenic hydrocarbon. As pointed out previously, such propylene polymers exhibit a combination of physical properties that are completely unexpected, particularly in view of the small amounts of acetylenic hydrocarbon present therein.

Generally, a mole ratio of second component to metal halide of 0.1:1 to 12:1 is satisfactory in the practice of the process. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3 percent or more can be used.

The temperature of the multistage polymerization process can be widely varied. However, temperatures ranging from about 0° C. to about 300° C. can generally be employed. When solid, stereospecific catalysts containing second components other than lithium and lithium compounds are employed, it is desirable to use temperatures of 100° C. or less. In slurry polymerizations at temperatures below 100° C., for example, 80° C. the inherent viscosities of polymer can be controlled by the use of a chain terminating agent, for example, hydrogen. In melt or solution polymerization at temperatures above 100° C., desirably above 130° C., and preferably above 150° C., the inherent viscosity is easily controlled by selection of the reaction temperature and, to a lesser extent, by controlling pressure.

A suitable pressure range for the preparation of the novel polymers of this invention includes pressures from atmospheric to pressures of about 2,000 atmospheres or more. Generally, it is desirable to use pressures in excess of 15 or even 30 atmospheres, with pressures in the range of about 50 to about 100, or even 500 atmospheres often being used in order to obtain satisfactory rates of reaction. Elevated pressures, for example, 2 to 1,500 atmospheres are often required for polymerization reactions run in the absence of a solvent.

The organic vehicles or solvents that can be employed as reaction media in the process of this invention include aliphatic alkanes or cycloalkanes such as propane, pentane, hexane, heptane, cyclohexane and the like, or hydrogenated aromatic compounds such as tetrahydronaphthalene or decahydronaphthalene or a high molecular weight liquid paraffin or mixture of paraffins which are liquid at the reaction temperature or an aromatic hydrocarbon such as benzene, toluene, xylene and the like. The nature of the vehicle or solvent is subject to considerable variation but the solvent should be in liquid form at the reaction conditions and relatively inert to the reactants and reaction products. Other compounds that can be employed with good results include ethyl benzene, isopropyl benzene, ethyl toluene, n-propyl benzene, the diethyl benzenes, mono and dialkyl naphthalenes, n-pentane, n-octane, isooctane, methyl cyclohexane, mineral spirits and any of the other well known inert hydrocarbons.

In forming the propylene polymers exhibiting optimum stiffnesses and tensile values acetylenic hydrocarbons used to prepare the crystalline tail segments are desirably the readily polymerizable monoacetylenic hydrocarbons, and preferably the monoacetylenic hydrocarbons containing 2 to 10 carbon atoms, and having the formula $$HC{\equiv}CR$$

where R is hydrogen or an alkyl radical containing 1 to 8 carbon atoms. Suitable acetylenic hydrocarbons include, therefore, acetylene, methylacetylene, ethylacetylene, propylacetylene, butylacetylene and the like.

This invention can be further illustrated by the following examples of preferred embodiments thereof although it will be understood that these examples are included merely for purposes of illustration and are not intended to limit the scope of the invention unless otherwise specifically indicated.

EXAMPLE 1

0.9 gram of $LiAlH_4$ and 3.6 grams of $TiCl_3$ slurried in 650 ml. of mineral spirits is charged to a 2 liter stirred autoclave. The autoclave is purged with dry nitrogen, sealed and heated to 150° C. Propylene is pumped into the reactor to a pressure of 1000 p.s.i.g. The temperature rises to about 160° C. and propylene is polymerized for 10 minutes resulting in a pressure drop to 700 p.s.i.g. Acetylene (3.1 g.), absorbed in 250 ml. of mineral spirits, is then pumped into the reactor. The reaction is run for 1 hour.

The autoclave is then discharged through a filter to remove the catalyst. The hot molten polymer dope is concentrated by stripping with hot propylene at 190° C., the molten polymer extruded into a water bath and chopped into ⅛-inch pellets. The pellets contain 28 percent volatiles (mineral spirits). Hexane extraction at 68–69° C. for 24 hours removes mineral spirits and amorphous polymer from the pellets.

The yield for propylene-acetylene polymer is 264 grams containing 0.5 percent, by weight, acetylene. 39 grams of amorphous polymer is recovered from the hexane extract.

As already indicated, the propylene-acetylene polymers exhibit a superior combination of properties when compared with prior art crystalline polymers, for example, crystalline polypropylene. This superior combination of properties is completely unexpected particularly in view of the very small amount of polymerized acetylenic hydrocarbon which can be present in the novel polymers of this invention. To illustrate this superior combination of properties, the properties of the polymer prepared using the above procedure is compared with crystalline polypropylene having a comparable molecular weight and prepared in the same manner. The properties of the two crystalline polymers are set forth in the following table.

*Table 1*

| Properties | Polypropylene | Propylene-Acetylene Polymers |
|---|---|---|
| Percent Acetylene | 0 | 0.5 |
| Density (ASTM D1505) | 0.9086 | 0.9111 |
| Brittleness Temperature, ° C. (ASTM D746) | >+20 | >+20 |
| Inherent Viscosity in Tetralin 0.25 conc. at 145° C | 1.70 | 1.72 |
| Tensile Strength at 2 in./min. (ASTM D638): | | |
| At Fracture | 2,600 | 5,360 |
| At Yield | 4,540 | 5,360 |
| Stiffness in Flexure, p.s.i. (ASTM D747) | 125,000 | 162,000 |
| Vicat Softening Point, ° C. (ASTM D1525) | 144 | 147 |

From an examination of the above table it can be seen that the novel polymers of this invention exhibit an unexpectedly superior combination of physical properties, particularly stiffness, tensile strength and Vicat softening point, when compared with prior art crystalline polymers. The increased stiffness and tensile strengths are particularly significant in molding, film and fiber applications.

EXAMPLE 2

Using the procedure of Example 1, three propylene-acetylenic hydrocarbon polymers are prepared. The properties of these polymers are set forth in the following table.

*Table 2*

| Properties | Run 1 | Run 2 | Run 3 |
|---|---|---|---|
| Percent Acetylene | 0.7 | | |
| Percent Methylacetylene | | 0.4 | 2.0 |
| Density (ASTM D1505) | 0.9117 | 0.9134 | 0.9156 |
| Brittleness Temperature, ° C. (ASTM D746) | >+20 | >+23 | >+23 |
| Inherent Viscosity in Tetralin, 0.25 conc. at 145° C | 2.09 | 2.12 | 2.04 |
| Tensile Strength at 2 in./min. (ASTM D638): | | | |
| At Fracture | 4,970 | 4,770 | 5,460 |
| At Yield | 5,560 | 5,570 | 5,460 |
| Stiffness in flexure, p.s.i. (ASTM D747) | 173,000 | 175,000 | 156,000 |
| Vicat Softening Point, ° C. (ASTM D1525) | 149 | 149 | 146 |

EXAMPLE 3

Propylene-acetylene polymer is produced in a continuous stirred reactor employing a 0.05% slurry of a 2:1:3 mole ratio of ethyl aluminum sesquichloride, hexamethyl phosphoramide and titanium trichloride in cyclohexane as the catalyst. The polymerization is carried out at 400 p.s.i.g. and 70° C. Acetylene is added as a 0.5% solution is cyclohexane and the reactor maintained at pressure by charging propylene directly.

The polymer-catalyst slurry is let down to a gas-slurry separator and unreacted propylene is flashed off and recycled. The slurry is fed to a centrifuge and the catalyst removal effected with hot isobutanol washing.

Polymer yield per unit of catalyst is 163 gm./gm. and the polymer contains 0.56%, by weight, acetylene after hexane extraction to remove amorphous material. The propylene-acetylene polymer containing (by weight), 0.56% acetylene has a stiffness in flexure of 180,000 and a tensile strength at yield of 5980.

EXAMPLE 4

Two runs (Runs 1 and 3) using the procedure of Example 3 and one run (Run 2) using the procedure of Example 1 are made using methylacetylene as the acetylenic hydrocarbon. The results and conditions of these runs are set forth in the following table.

*Table 3*

| Run | Catalyst | Mole Ratio of components in catalyst | Polymerization Conditions | | | Weight Percent Methylacetylene in Propylene-methylacetylene polymer | Stiffness [1] in Flexure, p.s.i. | Tensile [2] Strength at 2 in./min. at Yield |
|---|---|---|---|---|---|---|---|---|
| | | | Solvent | Temp., °C. | Pressure, p.s.i.g. | | | |
| 1 | Et₃Al, VCl₃, NaF | 2/1/1 | Mineral Spirits | 80 | 400 | 0.32 | 173,000 | 5,560 |
| 2 | Li, LiAlH₄, TiCl₃, NaF | 2/0.5/1/1 | Cyclohexane | 175 | 1,200 | 0.41 | 166,000 | 5,490 |
| 3 | Et₂AlCl, CrCl₃ | 1/1 | do | 77 | 410 | 0.24 | 174,000 | 5,600 |

[1] ASTM D747.  [2] ASTM D638.

The propylene-acetylenic hydrocarbon polymers of this invention are preferred for many applications by virtue of their very excellent combination of physical properties, particularly their high stiffnesses and tensile strengths. By virtue of these improved properties the propylene-acetylenic hydrocarbon polymers, can be used as substitutes for crystalline polypropylene in applications where these properties are of significance, for example, in molding, film and fiber applications. The novel propylene polymers described herein of this invention have many advantages in specific uses. For example, in fibers and monofilaments the novel polymers of this invention are superior to crystalline polypropylene in that they draw down less and afford tougher filaments resulting in fewer breaks when spinning the finer deniers. Such fibers and filaments can be made in varying deniers and cross sections, and find use as staple or continuous filament yarns and tows, both bulked and unbulked. Such polymer fibers, filaments, tows and yarns find use in textile applications, rugs, industrial fabrics, batts, filters (including cigarette filters) and various other applications where their unique combination of properties make them particularly useful. In films, the propylene polymers of this invention have good toughness, tear resistance and impact strength while exhibiting excellent optical properties. These same advantages also apply to magnetic tape base and photographic film base prepared from the novel polymers of this invention.

In wire covering and cable jacketing most of the novel polymers of this invention offer the advantage of better impact strength, elongation, stress crack resistance and low temperature toughness. The same advantages can be attained when the propylene polymers are employed in paper coatings as well as in other surface coatings and laminates with both fibrous and non-fibrous materials, such as laminates with other resins on other novel polymers of this invention or with foils or the like. In molded and extruded articles, one very significant advantage of the novel polymers of this invention, and particularly propylene-acetylenic hydrocarbon polymers, are improved stiffness and tensile strength.

In all of the aforementioned uses, the ease of processability of propylene polymers is an important advantage over many of the high molecular weight solid polymers known in the prior art, for example, high density polyethylene and acrylonitrile-butadiene-styrene polymer resins.

The propylene polymers disclosed herein can be stabilized with a variety of antioxidants, alone or in admixture. Thus, for example, the N,N-dialkyl dithiocarbamates, alkyl phenyl salicylates, N,N-diphenyl-p-phenylene-diamines, 2-hydroxy benzophenones or butylated hydroxy toluenes and the like can be employed with good results. Specific antioxidants which can be employed include 4,4'-butylidene-bis(6-tert. butyl-meta-cresol), dilauryl-3,3'-thio-dipropionate, N-butylated-p-amino phenol, N,N'-disecondary-butyl-p-phenylene-diamine, 2,6-ditertiarybutyl-p-cresol, 2,6-ditertiarybutyl-4-methyl phenol, disalicylal propylene di-imine, N,N-disalicylidene-1,2-diaminopropane, N,N'-di(1-methyl heptyl)-p-phenylenediamine, N,N'-di-2-octyl-p-phenylenediamine, N,N'-di(1-ethyl-3-methyl pentyl)p-phenylenediamine, N,N'-di-3(5-methyl heptyl)-p-phenylenediamine, N-1,N-3-dioleoyldiethylene triamine, cresylic acid, diacetone alcohol, isopropanol, toluene, mixed xylenes, butylated hydroxyanisole, butylated hydroxytoluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4'-butylidene-bis(6-tert. butyl-meta-cresol), or butyl hydroxy toluene. Metal soaps such as calcium stearate can be added, preferably at concentrations of 1 percent or less, to enhance stability and improve mold release properties of the polymers. Slip agents such as oleamide or erucylamide or anti-block agents such as colloidal silica may also be added particularly where the propylene polymers are to be used for film. Furthermore, pigments, extenders, plasticizers or fillers, as exemplified by titanium oxides, calcium hydroxide or silicates, can be added to the novel polymers of this invention. For use in fiber formation, mixtures of the novel polymers of this invention with polyesters or polyamides, for example, nylon, can be used in order to obtain improved dye affinity together with optimum fiber properties. In addition, the propylene polymers disclosed herein can be thermally degraded at temperatures above their critical temperatures to form useful products. Low molecular weight liquid and waxy polymers also can be made and show excellent adaptability for specialized uses. The novel polymers of this invention are also used in wrapping materials, fluid containers, fluid conduits or like articles.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A block copolymer in which the chains consist essentially of at least one block of crystalline polymerized propylene, and at least one block of crystalline polymerized acetylenic hydrocarbon, said block copolymer exhibiting improved stiffness in flexure and tensile strength and having a molecular weight of at least 10,000, a density of at least 0.85 and containing at least 80 percent, by weight, of polymerized propylene.

2. A block copolymer in which the chains consist essentially of at least one block of crystalline polymerized propylene, and at least one block of crystalline polymerized acetylenic hydrocarbon, containing 2 to 10 carbon atoms, said block copolymer exhibiting improved stiffness in flexure and tensile strength and having a molecular weight of at least 10,000, a density of at least 0.85 and containing at least 80 percent, by weight, of said polymerized propylene and at least .1 percent, by weight, of said polymerized acetylenic hydrocarbon containing 2 to 10 carbon atoms.

3. A block copolymer in which the chains consist essentially of at least one block of crystalline polymerized propylene, and at least one block of crystalline polymerized acetylenic hydrocarbon containing 2 to 10 carbon atoms, said block copolymer exhibiting improved stiffness in flexure and tensile strength and having a molecular weight of at least 10,000, a density of at least 0.85 and containing no more than 5 percent, by weight, of said polymerized acetylenic hydrocarbon containing 2 to 10 carbon atoms.

4. A block copolymer in which the chains consist essentially of at least one block of crystalline polymerized propylene, and at least one block of crystalline polymerized acetylene, said block copolymer exhibiting improved stiffness in flexure and tensile strength and having a molecular weight of at least 10,000, a density of at least 0.85 and containing about .1 to about 5 percent, by weight, of polymerized acetylene.

5. A block copolymer in which the chains consist essentially of at least one block of crystalline polymerized propylene, and at least one block of crystalline polymerized methylacetylene, said block copolymer exhibiting improved stiffness in flexure and tensile strength and having a molecular weight of at least 10,000, a density of at least 0.85 and containing about .1 to about 5 percent, by weight, of polymerized methylacetylene.

6. A block copolymer in which the chains consist essentially of at least one block of crystalline polymerized propylene, and at least one block of crystalline polymerized acetylene, said block copolymer exhibiting improved stiffness in flexure and tensile strength and having a molecular weight of about 64,000, a density of about .91, and containing about .5 percent, by weight, of polymerized acetylene.

7. A block copolymer in which the chains consist essentially of at least one block of crystalline polymerized propylene, and at least one block of crystalline polymerized acetylene, said block copolymer exhibiting improved stiffness in flexure and tensile strength and having a molecular weight of about 76,000, a density of about .91, and containing about .7 percent, by weight, of polymerized acetylene.

8. A block copolymer in which the chains consist essentially of at least one block of crystalline polymerized propylene, and at least one block of crystalline polymerized methylacetylene, said block copolymer exhibiting improved stiffness in flexure and tensile strength and having a molecular weight of about 76,000, a density of about .91 and containing about .4 percent, by weight, of polymerized methylacetylene.

9. A block copolymer in which the chains consist essentially of at least one block of crystalline polymerized propylene, and at least one block of crystalline polymerized methylacetylene, said block copolymer exhibiting improved stiffness in flexure and tensile strength and having a molecular weight of about 76,000, a density of about .91 and containing about 2 percent, by weight, of polymerized methylacetylene.

10. The process for preparing a block copolymer which comprises initially polymerizing propylene and then polymerizing an acetylenic hydrocarbon in the presence of the polymerized propylene until a polymer containing at least 80 percent, by weight, of polymerized propylene and at least .1 percent, by weight, of said polymerized acetylenic hydrocarbon forms, said polymerization being at a temperature in the range of about 0 to 300° C. and a pressure in the range of about 1 to about 2,000 atmospheres in the presence of a solid stereospecific polymerization catalyst.

11. The process for preparing a block copolymer which comprises initially polymerizing an acetylenic hydrocarbon and then polymerizing propylene in the presence of the polymerized acetylenic hydrocarbon until a polymer containing at least 80 percent, by weight, of polymerized propylene and at least .1 percent, by weight, of polymerized acetylenic hydrocarbon forms, said polymerization being at a temperature in the range of about 0 to about 300° C. and a pressure in the range of about 1 to about 2,000 atmospheres in the presence of a solid stereospecific polymerization catalyst.

12. The process for preparing a block copolymer which comprises initially polymerizing propylene and then polymerizing an acetylenic hydrocarbon in the presence of the polymerized propylene until a polymer containing at least 80 percent, by weight, of polymerized propylene and at least .1 percent, by weight, of said polymerized acetylenic hydrocarbon forms, said polymerization being at a temperature in the range of about 0 to about 300° C. and a pressure in the range of about 1 to about 2,000 atmospheres in the presence of a solid stereospecific polymerization catalyst, one component of said catalyst being a halide of a transition metal from Group IV-B to Group VI-B of the Periodic Table and the second component being selected from the group consisting of (a) aluminum, (b) a metal from Group I-A to Group II of the Periodic Table, (c) alloys, halides, complex hydrides and organo derivatives of a metal selected from the group consisting of aluminum and a metal from Group I-A to Group II of the Periodic Table, and (d) a complex organometallic compound of a metal from Group I-A to Group II of the Periodic Table with boron.

13. The process for preparing a block copolymer which comprises initially polymerizing propylene and then polymerizing an acetylenic hydrocarbon in the presence of the polymerized propylene until a polymer containing 80 percent, by weight, of polymerized propylene and at least .1 percent, by weight, of said acetylenic hydrocarbon forms, said polymerization being at a temperature in the range of about 130 to about 170° C. and a pressure in the range of about 50 to about 150 atmospheres in the presence of a solid stereospecific catalyst, one component of said catalyst being a member selected from the group consisting of lithium metal and lithium aluminum hydride and the second component being a subvalent chloride of a transition metal selected from the group consisting of titanium, vanadium, chrominum, molybdenum, and tungsten.

14. The process of claim 13 in which the acetylenic hydrocarbon is an acetylenic hydrocarbon containing 2 to 10 carbon atoms.

15. The process for preparing a block copolymer which comprises initially polymerizing propylene and then polymerizing acetylene in the presence of the polymerized propylene until a polymer containing at least 80 percent, by weight, of polymerized propylene and at least .1 percent, by weight, of polymerized acetylene forms, said polymerization being at a temperature in the range of about 130 to about 170° C. and a pressure in the range of about 50 to about 150 atmospheres in the presence of a solid stereospecific polymerization catalyst containing titanium halide and lithium aluminum hydride.

16. The process for preparing a block copolymer which comprises initially polymerizing propylene and then polymerizing acetylene in the presence of the polymerizd propylene until a polymer containing at least 80 percent, by weight, of polymerized acetylene and at least .1 percent, by weight, of polymerized acetylene forms, said polymerization being at a temperature in the range of about 80 to about 100° C. and a pressure in the range of about 30 atmospheres to about 100 atmospheres in the presence of a solid stereospecific polymerization catalyst containing titanium halide and alkyl aluminum halide.

17. The process of claim 16 in which the solid stereospecific catalyst contains a titanium halide and alkyl aluminum sesquihalide.

References Cited by the Examiner

UNITED STATES PATENTS

| | | | |
|---|---|---|---|
| 2,700,663 | 1/1955 | Peters | 260—94.9 |
| 2,886,561 | 5/1959 | Reynolds et al. | 260—94.9 |
| 3,097,195 | 7/1963 | Kennerly et al. | 260—88.2 |

FOREIGN PATENTS

| | | |
|---|---|---|
| 570,538 | 2/1959 | Canada. |
| 856,734 | 12/1960 | Great Britain. |

OTHER REFERENCES

Natta: Journal of Polymer Science, 34 (1959), pages 531–549.

SAMUEL H. BLECH, *Primary Examiner.*

LEON J. BERCOVITZ, MURRAY TILLMAN,
*Examiners.*